UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

GREEN SULFUR DYE.

No. 843,156.     Specification of Letters Patent.     Patented Feb. 5, 1907.

Application filed November 6, 1906. Serial No. 342,175.

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hesse, Germany, have invented new and useful Improvements in Green Sulfur Dyestuffs, of which the following is a specification.

I have found that new green sulfur dyestuffs result by melting in the presence of copper alkaline polysulfids with indophenols, obtained by joint oxidation of para-amidophenol and alpha-naphthylarylsulfamids, (as described by O. N. Witt and G. Schmitt, *Berichte der Deutschen Chemischen Gesellschaft*, XXVII, 2370.) In place of the indophenols their leuco derivatives obtained by reduction can be used in producing the dyestuffs. The dyestuffs thus obtained are easy soluble in water and notwithstanding extremely fast to washing.

The following examples will illustrate my invention. The parts are by weight.

*Example—Process of making the indophenols and their leuco derivatives.*—One hundred and nine parts of para-amidophenol are dissolved in one thousand parts of water and one hundred and forty parts of caustic-soda lye, 35° Baumé; two hundred and ninety-seven parts of alpha-naphthyl-para-tolylsulfamid are dissolved in one thousand parts of water and two hundred and ten parts of caustic-soda lye, 35° Baumé. Both solutions are mixed, cooled by means of ice, and then an ice-cold solution of hypochlorite of sodium, containing thirty-two parts of active oxygen, is poured in. The temperature is kept below zero during the oxidizing process. The indophenol separates out as a resinous matter and can be directly melted with alkaline polysulfids. To obtain the leuco derivatives, a concentrated solution of three hundred and sixty parts of sodium sulfid is added to the mixture containing the indophenol. By heating up to 75° centigrade an almost clear solution is obtained, which may be filtered. The phenylnaphthylamin derivative is precipitated in form of a yellow-brown deposit by the addition of a mineral acid. The deposit is filtered off and pressed. It is of great advantage to melt the leuco paste with alkaline polysulfids at once, as it will be oxidized in getting dry. An alkaline solution of the leuco compound will be oxidized very quickly, producing a bluish-violet color. In an alkaline alcoholic solution of the leuco derivative a pure blue is produced by the influence of the air.

*Process of making the sulfur dyestuffs.*—Forty-six parts of the indophenol obtained from para-amidophenol and alpha-naphthyl-paratolylsulfamid or the corresponding quantity of the leuco paste are melted together with one hundred and sixty-eight parts of crystallized sodium sulfid and sixty-seven parts of sulfur, a solution of eight parts of sulfate of copper or two parts of metallic copper powder having been added. The mixture is evaporated till the temperature of it shows 120° centigrade. The temperature is kept at this point for twenty hours. The resulting green melt is diluted with one thousand parts of water heated and filtered off from impurities. The dyestuff is precipitated by introducing a current of air in the solution. The dry dyestuff is a black-green powder hardly soluble in water, soluble in concentrated sulfuric acid with blue color, in alkali sulfids with green color. It dyes cotton green tints of remarkable fastness to washing. The process of making dyestuffs from other alpha-naphthylsulfamids—for instance, alpha-naphthylbenzene sulfamids—may be performed in the same manner.

Now what I claim, and desire to secure by Letters Patent, is the following:

1. The process of making green sulfur dyestuffs by heating indophenols, obtained by joint oxidation of para-amidophenol and alpha-naphthylarylsulfamids, with alkali polysulfids in the presence of copper, substantially as described.

2. As a new article of manufacture the green sulfur dyestuffs resulting by heating the indophenols, obtained by the joint oxidation of para-amidophenol and alpha-naphthylarylsulfamids with alkali polysulfids in the presence of copper, which dyestuffs form black-green powders, hardly soluble in water, soluble in concentrated sulfuric acid with blue color, in sodium sulfid with green color, dyeing cotton green shades of remarkable fastness to washing, substantially as described.

In testimony that I claim the foregoing as my invention I have signed my name, in presence of two witnesses, this 23d day of October, 1906.

AUGUST LEOPOLD LASKA.

Witnesses:
   Eva Sattler,
   Askrer Standbrandt.